US012397922B1

(12) United States Patent
Parsons et al.

(10) Patent No.: US 12,397,922 B1
(45) Date of Patent: Aug. 26, 2025

(54) ENGINE NACELLE INLET HAVING A TURBULATOR SEGMENT

(71) Applicant: The Boeing Company, Arlington, VA (US)

(72) Inventors: Jason Christopher Parsons, Summerville, SC (US); Thomas Chlaupek, Charleston, SC (US); Rocco Tomasso, Seattle, WA (US); Jeremiah D. Langston, Summerville, SC (US); Taurus Brackett, II, Summerville, SC (US); Patrick James Macko, North Charleston, SC (US); Jeffrey Scott Harasha, Bellevue, WA (US); Daniel Joseph Goering, Seattle, WA (US); Andrew David Clark, Mill Creek, WA (US)

(73) Assignee: THE BOEING COMPANY, Arlington, VA (US)

(*) Notice: Subject to any disclaimer, the term of this patent is extended or adjusted under 35 U.S.C. 154(b) by 0 days.

(21) Appl. No.: 18/660,526

(22) Filed: May 10, 2024

(51) Int. Cl.
B64D 33/02 (2006.01)
F01D 25/12 (2006.01)

(52) U.S. Cl.
CPC ............ B64D 33/02 (2013.01); F01D 25/12 (2013.01); B64D 2033/024 (2013.01); F05D 2260/232 (2013.01)

(58) Field of Classification Search
CPC ... B64D 33/02; B64D 2033/024; F01D 25/12; F05D 2260/232
See application file for complete search history.

(56) References Cited

U.S. PATENT DOCUMENTS

| 3,578,264 | A | * | 5/1971 | Kuethe | F28F 1/32 181/220 |
| 3,664,612 | A | * | 5/1972 | Skidmore et al. | B64D 33/02 137/15.1 |
| 3,819,008 | A | * | 6/1974 | Evans | F02C 7/045 428/116 |
| 4,154,256 | A | * | 5/1979 | Miller | B64D 33/02 137/15.1 |
| 5,156,362 | A | * | 10/1992 | Leon | B64D 33/02 244/130 |
| 6,655,632 | B1 | * | 12/2003 | Gupta | B64C 23/06 244/1 N |

(Continued)

OTHER PUBLICATIONS

Davis, W., et al., "Infrared thermography techniques for boundary layer state visualisation", XXVI Biennial Symposium on Measuring Techniques in Turbomachinery, Journal of Physics: Conference Series, Aug. 24, 2023, pp. 1-16.

(Continued)

Primary Examiner — J. Todd Newton
(74) Attorney, Agent, or Firm — COATS & BENNETT, PLLC

(57) ABSTRACT

A nacelle inlet for an engine. The nacelle inlet includes an inner flow surface, an outer flow surface, and a turbulator segment positioned along the inner flow surface. The turbulator segment extends outward beyond the inner flow surface and is configured to transition laminar airflow along the inner flow surface upstream from the turbulator segment to turbulent airflow downstream from the turbulator segment.

20 Claims, 12 Drawing Sheets

(56) References Cited

U.S. PATENT DOCUMENTS

| | | | | |
|---|---|---|---|---|
| 7,878,759 | B2* | 2/2011 | Mills | F04D 29/668 |
| | | | | 416/61 |
| 8,408,491 | B2* | 4/2013 | Jain | F02C 7/042 |
| | | | | 415/126 |
| 8,529,188 | B2* | 9/2013 | Winter | F02C 7/042 |
| | | | | 415/126 |
| 9,273,558 | B2 | 3/2016 | Liang | |
| 9,725,190 | B2 | 8/2017 | Batt et al. | |
| 10,294,867 | B2 | 5/2019 | Lumbab et al. | |
| 11,702,982 | B2 | 7/2023 | Gelzer et al. | |
| 2005/0274103 | A1* | 12/2005 | Prasad | B64D 33/02 |
| | | | | 137/15.1 |
| 2009/0155067 | A1* | 6/2009 | Haas | B64D 33/02 |
| | | | | 415/208.1 |
| 2021/0231054 | A1* | 7/2021 | Dindar | F02C 7/057 |
| 2022/0099023 | A1* | 3/2022 | Pascal | B64D 15/04 |
| 2022/0356839 | A1* | 11/2022 | LaBelle | F01D 25/243 |

OTHER PUBLICATIONS

Luckring, J., et al., "An Application of CFD to Guide Forced Boundary-Layer Transition for Low-Speed Tests of a Hybrid Wing-Body Configuration", AIAA 34th Applied Aerodynamics Conference, Jan. 1, 2016, pp. 1-23, Washington, DC.

Van Nesselrooij, M., et al., "Drag reduction in turbulent boundary layers by means of dimpled surfaces", Delft University of Technology, Faculty of Aerospace Engineering, Dec. 4, 2017, pp. 1-19.

* cited by examiner

ENGINE NACELLE INLET HAVING A TURBULATOR SEGMENT

TECHNOLOGICAL FIELD

The present disclosure relates generally to the field of engine nacelles and, more specifically, the present disclosure relates to the field of transitioning airflow from laminar to turbulent within an engine nacelle inlet to facilitate cooling.

BACKGROUND

An engine nacelle is a housing that extends around an engine on an aircraft. The nacelle includes an inlet that directs the air to the engine. The nacelle inlet functions to protect the engine, such as a gas turbine engine, from ingesting foreign objects. The nacelle inlet is further configured to direct air to the engine. The nacelle inlet is heated during aircraft use to prevent icing. One method for inlet heating occurs by directing heated air from the engine into one or more interior sections of the nacelle inlet. An issue with the heating is that one or more sections of the nacelle inlet can reach an excessively elevated temperature. One location of the nacelle inlet that can experience excessively elevated temperatures is along an inner flow surface of the nacelle inlet.

Cooling of the one or more sections of the nacelle inlet occurs as a result of heat transfer to the air that enters the engine through the nacelle inlet. As a product of the air flowing along the surfaces, heat is drawn out of the one or more sections which reduces the surface temperature. The inner flow surface of the nacelle inlet is configured to promote laminar airflow over the one or more sections. However the boundary layer is relatively slow moving and retains the heat drawn from the heated lipskin and carries this heat downstream. Turbulent airflow disrupts this boundary layer heat transfer effect by promoting mixing with the adjacent cooler airflow, thus reducing the heat transfer into adjacent structure downstream.

Thus, there is a need to transition airflow from laminar to turbulent locally within the nacelle inlet to reduce excessive temperature of adjacent structure downstream of the heated sections.

SUMMARY

One aspect is directed to a nacelle inlet for an engine. The nacelle inlet comprises an inner flow surface, an outer flow surface, and a turbulator segment positioned along the inner flow surface. The turbulator segment extends outward beyond the inner flow surface and is configured to transition laminar airflow along the inner flow surface upstream from the turbulator segment to turbulent airflow downstream from the turbulator segment.

In another aspect, the turbulator segment is a strip that is connected to the inner flow surface with the strip comprising an inner face positioned towards the inner flow surface, an opposing outer face, a leading edge, and a trailing edge.

In another aspect, the strip extends completely around a circumference of the nacelle inlet.

In another aspect, the strip comprises a plurality of discrete sections that are spaced apart by gaps.

In another aspect, the turbulator segment comprises a plurality of fasteners with the plurality of fasteners comprising heads that extend outward beyond the inner flow surface.

In another aspect, the heads are aligned in a row around a circumference of the nacelle inlet.

In another aspect, the turbulator segment is positioned on one or more members that are connected to the inner flow surface.

In another aspect, the one or more members are constructed from materials that are different from the inner flow surface.

In another aspect, the turbulator segment comprises one or more strips and fasteners that extend through the one or more strips and into the inner flow surface.

One aspect is directed to a nacelle inlet for an engine. The nacelle inlet comprises a lipskin positioned at a forward end of the nacelle inlet with the lipskin comprising a lipskin inner flow surface that extends to an inner lipskin edge. An inner barrel is positioned downstream from the lipskin inner flow surface. A joint is formed between the inner lipskin edge and a leading edge of the inner barrel. A turbulator segment is positioned at the lipskin inner flow surface upstream from the joint with the turbulator segment configured to transition laminar airflow to turbulent airflow downstream from the joint to draw heat from the inner barrel.

In another aspect, the inner barrel comprises inner barrel structural plies that are constructed from composite material.

In another aspect, the turbulator segment is a strip that is connected to the nacelle inlet and that extends outward beyond the lipskin inner flow surface.

In another aspect, the strip is a continuous band that extends completely around a circumference of the nacelle inlet.

In another aspect, the turbulator segment comprises a leading edge and a trailing edge with the trailing edge aligned with the joint.

In another aspect, the turbulator segment comprises a leading edge and a trailing edge and with the turbulator segment positioned forward of the joint such that the trailing edge is spaced away from the inner lipskin edge by a distance.

In another aspect, a bulkhead spans a lipskin annulus with the bulkhead comprising a flange that extends across an inner side of the joint.

In another aspect, the turbulator segment comprises a plurality of fastener heads that extend outward beyond the inner flow surface.

In another aspect, the lipskin inner flow surface is substantially smooth.

In another aspect, the turbulator segment is a trough in the lipskin inner flow surface.

One aspect is directed to a method of cooling a section of an inner flow surface of a nacelle inlet. The method comprises: directing air through the nacelle inlet with laminar flow along an upstream section of the inner flow surface; directing the air over a raised turbulator segment on the inner flow surface after the air has passed over the upstream section and transitioning the air to turbulent flow; and directing the air with turbulent flow over a downstream section of the inner flow surface of the nacelle inlet.

In another aspect, the method further comprises directing the air over a strip that is attached to the inner flow surface and causing laminar flow to transition to turbulent flow.

The features, functions and advantages that have been discussed can be achieved independently in various aspects or may be combined in yet other aspects, further details of which can be seen with reference to the following description and the drawings.

DETAILED DESCRIPTION

Figure 1:
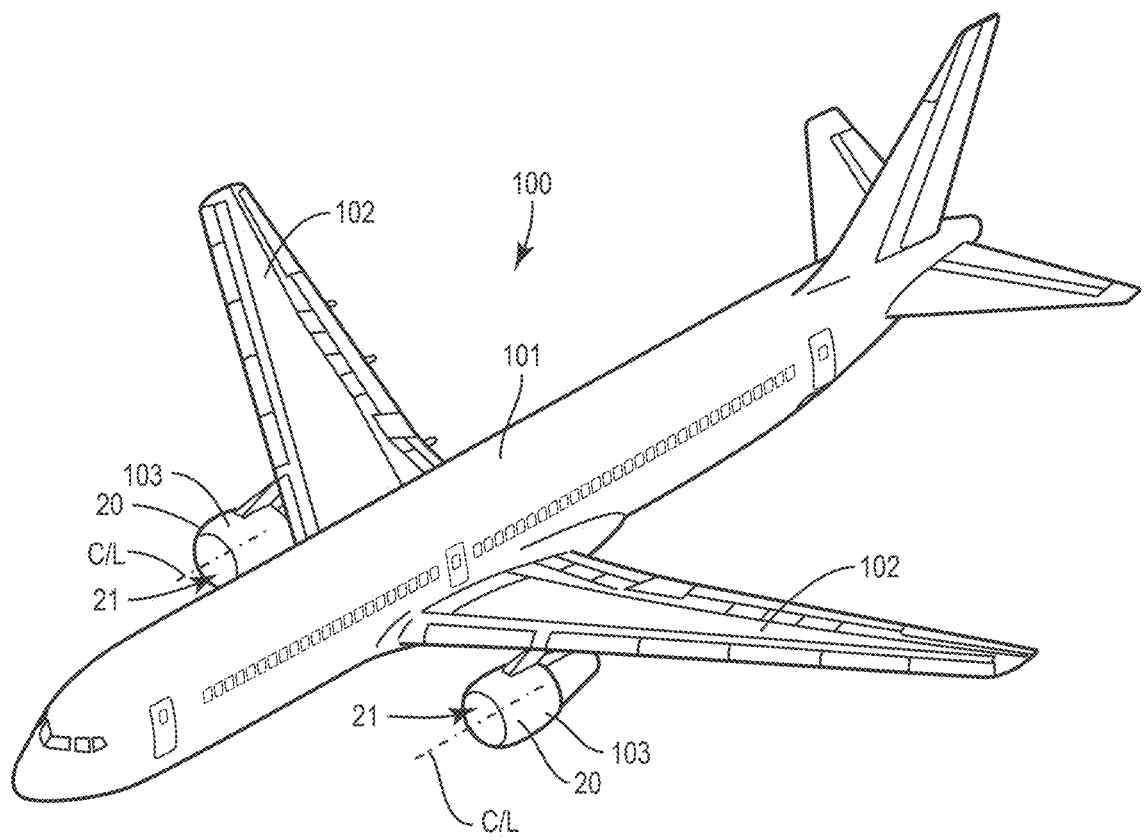
FIG. 1 is an isometric view of an aircraft with nacelles positioned underneath each of the wings.

FIG. 1 illustrates an aircraft 100 configured to transport people and/or cargo. The aircraft 100 generally includes a fuselage 101 and wings 102. Engines 103 are mounted on the wings 102 to propel the aircraft 100 during flight. The number and positioning of the engines 103 can vary depending upon the aircraft 100. In some examples, the engines 103 are gas turbine engines, such as turbofan engines.

Figure 2:
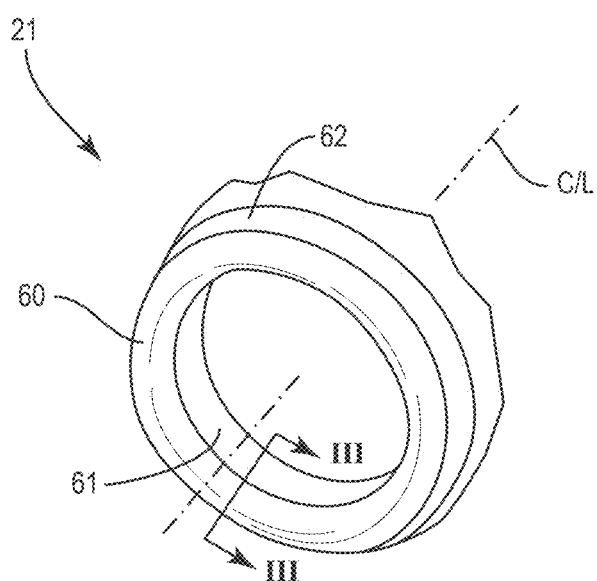
FIG. 2 is a perspective view of a nacelle inlet.
Figure 3:
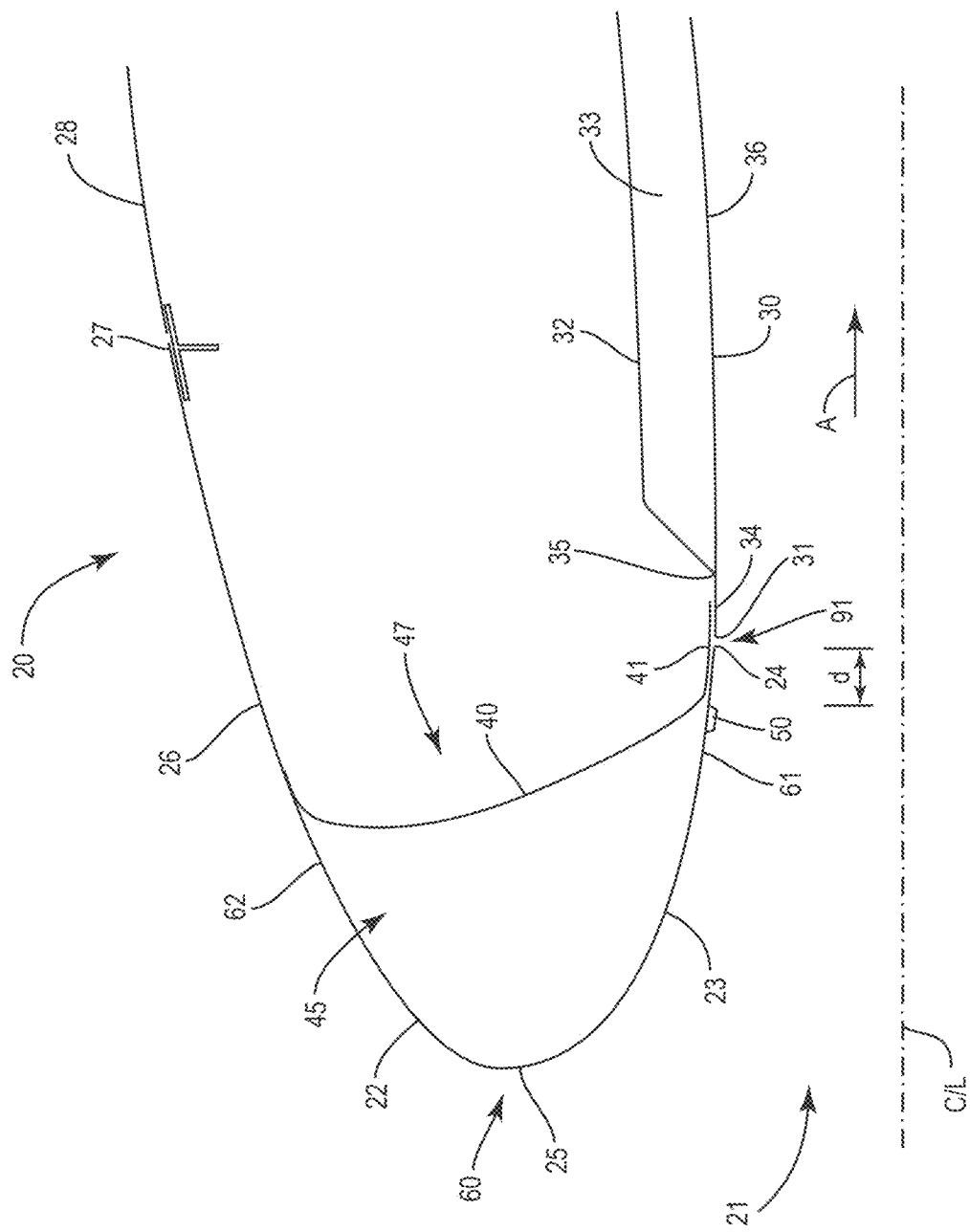
FIG. 3 is a schematic section view of a portion of the nacelle having an inner flow surface leading into the engine and an opposing outer flow surface.
Figure 4:
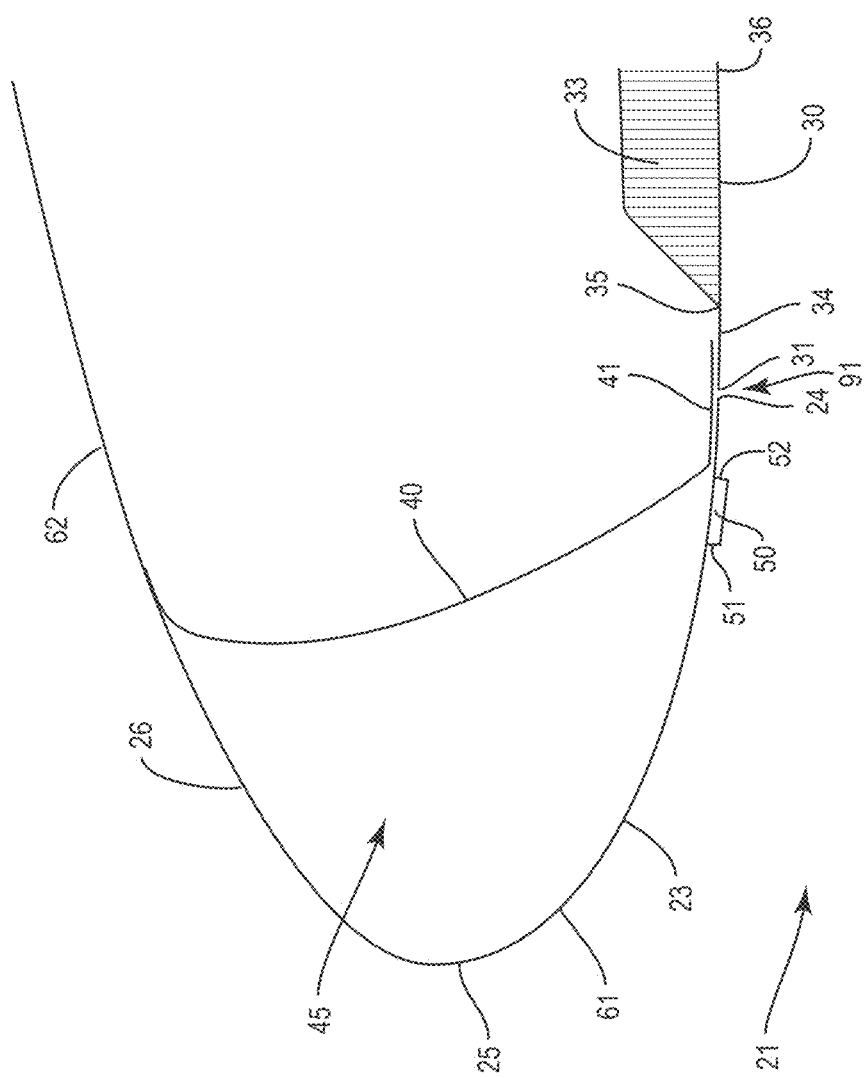
FIG. 4 is an enlarged view of the nacelle inlet portion of FIG. 3.

The engines 103 include a nacelle 20 that extends around the exterior. The nacelle 20 has an aerodynamic profile such as being round or elliptical to reduce drag. The nacelle 20 includes a nacelle inlet 21 that directs airflow into the engine 103 and with a centerline C/L that extends through the nacelle inlet 21. As illustrated in FIGS. 2 and 3, the nacelle inlet 21 includes a forward end 60, an inner flow surface 61 that extends along the inlet 21, and an outer flow surface 62 that extends along the exterior side. The inner flow surface 61 and outer flow surface 62 can be formed by one or more different components.

The forward section of the nacelle inlet 21 including the forward end 60 is formed by a lipskin 22. The lipskin 22 forms portions of both the inner flow surface 61 and the outer flow surface 62. Specifically the lipskin 22 includes a lipskin inner flow surface 23 that extends between an inner lipskin edge 24 and hilite 25. The lipskin 22 further includes a lipskin outer flow surface 26 that extends from the hilite 25 to an outer lipskin edge 27.

An inner barrel 30 extends aft from the inner lipskin edge 24. The inner barrel 30 includes inner barrel structural plies 32, a composite core 33, and an inner barrel perforated skin 36. The inner barrel structural plies 32 include an inner barrel edge band 34 that extends between a leading edge 31 and an inner barrel ramp transition 35. The inner barrel edge band 34 forms a portion of the inner flow surface 61. The leading edge 31 of the inner barrel 30 forms a joint 91 with the inner lipskin edge 24. A composite core 33 is bonded to the inner barrel structural plies 32 aft of the inner barrel ramp transition 35. The inner barrel 30 can include various other constructions and configurations than those illustrated herein.

A generally annular forward bulkhead 40 extends radially across a lipskin annulus 47. In some examples, the forward bulkhead 40 includes a flange 41 that extends across the joint 91. In other examples, the flange 41 is a separate member from the forward bulkhead 40. A duct 45 is formed between the bulkhead 40 and the lipskin 22 at the forward section of the nacelle inlet 21. In addition, a generally annular aft bulkhead (not illustrated) extends radially between the inner barrel 30 and the outer barrel 28.

The nacelle inlet 21 is configured to direct airflow to the engine 103. Airflow that enters through the nacelle inlet 21 flows in the direction of arrow A along the inner flow surface 61 that is formed by the lipskin inner flow surface 23, inner barrel edge band 34, and the inner barrel perforated skin 36.

The lipskin inner flow surface 23 is heated to prevent icing on the surface. In some examples, the heat is provided from high temperature bleed air that is routed from the engine 103 and directed into the duct 45 formed at the forward section of the nacelle inlet 21. In some examples, the bleed air has a temperature of about 1000° F. The heated air directed to this area can result in one or more of the elements in the nacelle inlet 21 being heated to an elevated temperature. In some examples, the forward bulkhead 40 is heated to a temperature of about 740° F. and the flange 41 is heated to a temperature range of 350° F.-500° F. Furthermore, the temperature of the inner barrel edge band 34 is elevated due to conduction with the flange 41. In some examples, the temperature of the inner barrel edge band 34 may approach a range of approximately 350° F.-500° F.

Airflow across the inner flow surface 61 removes heat from the inner barrel edge band 34 and the lipskin 22. The surface of the lipskin 22 is substantially smooth which results in laminar airflow across the inner flow surface 61. Heat transfer occurs between the lipskin 22 and laminar airflow which raises the temperature of the airflow boundary layer along the inner flow surface 61. This heat is carried downstream to the inner barrel edge band 34 raising the temperature of the inner barrel edge band 34. To address the issue of heat removal, a turbulator segment 50 at the lipskin inner flow surface 23 transitions laminar airflow to turbulent airflow. Turbulent airflow is directed over one or more of the sections of the downstream inner flow surface 61 to disrupt the boundary layer heat transfer effect from the one or more components. Turbulent airflow draws the heat from the one or more components and is more effective at reducing temperature than laminar airflow due to boundary layer mixing. In one example, turbulent airflow reduces the temperature of the inner barrel edge band 34.

In some examples, the turbulator segment 50 is formed on the nacelle inlet 21 during manufacturing. In other examples, the process is performed on existing aircraft that are in use. The process utilizes tools and machinery that facilitate retrofitting existing aircraft.

The turbulator segment 50 can include a variety of different configurations. The turbulator segment 50 can be positioned at various distances relative to the inner lipskin edge 24. In some examples, the turbulator segment 50 is spaced a distance d away from the inner lipskin edge 24. In other examples, the turbulator segment 50 is positioned at the inner lipskin edge 24.

Figure 5:
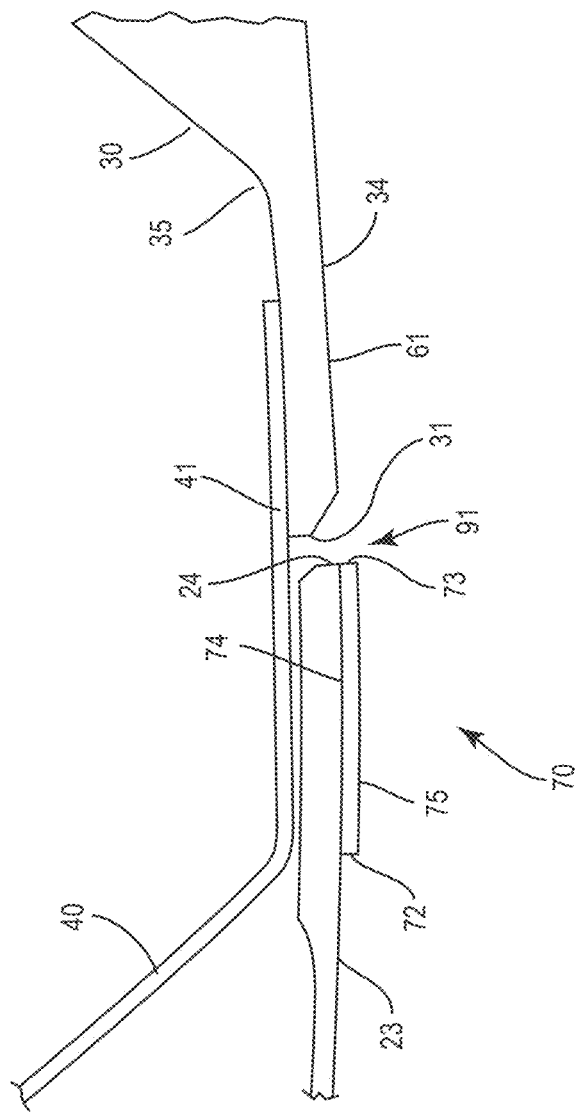
FIG. 5 is a schematic section view of a strip attached to a lipskin and forming a turbulator segment upstream from an inner barrel edge band.

In one example as illustrated in FIG. 5, the turbulator segment 50 is a strip 70 that is attached to the lipskin inner flow surface 23. The strip 70 includes an inner face 74 that contacts against the lipskin inner flow surface 23 and an opposing outer face 75 that is exposed. The strip 70 also includes a leading edge 72 and a trailing edge 73. The strip 70 includes a thickness measured between the inner face 74 and the outer face 75 that is sized to extend outward beyond the surface of the lipskin inner flow surface 23. The thickness can be constant throughout the strip 70 as illustrated in FIG. 5 or can vary along one or more sections.

Figure 6:
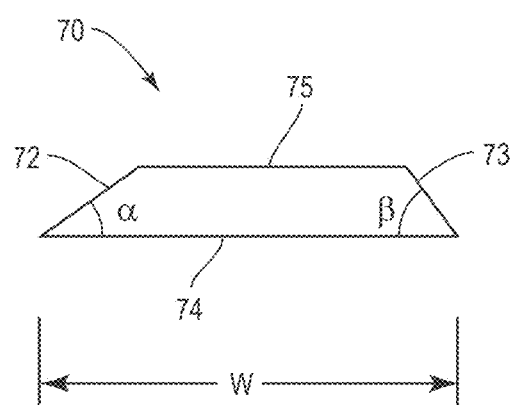
FIG. 6 is a side schematic view of a strip that forms a turbulator segment.

One or more of the leading edge 72 and the trailing edge 73 can be configured to facilitate turbulent airflow. As illustrated in FIG. 6, the leading edge 72 is aligned at an angle α with the inner face 74 and the trailing edge 73 is aligned at an angle β with the inner face 75. In some examples as illustrated in FIG. 6, the angles α, β are acute. In some examples as illustrated in FIG. 5, the angles α, β are at substantially 90. The angles α, β can be the same as illustrated in FIGS. 5 and 6 or can be different. In some examples, one or both of the leading edge 72 and trailing edge 73 are flat. In other examples, one or both include a variable surface with examples including but not limited to one or more curves and/or are rounded. The strip 70 includes a width W measured between the leading edge 72 and the trailing edge 73. The width W can be constant along the nacelle inlet 21 or can vary.

The strip 70 can be positioned at various locations along the lipskin inner flow surface 23. In some examples as illustrated in FIG. 5, the strip 70 is aligned at the joint 91 with the trailing edge 73 of the strip 70 aligned with the inner lipskin edge 24. In other examples, the strip 70 is positioned at various spacings that are forward of the inner lipskin edge 24.

Figure 7:
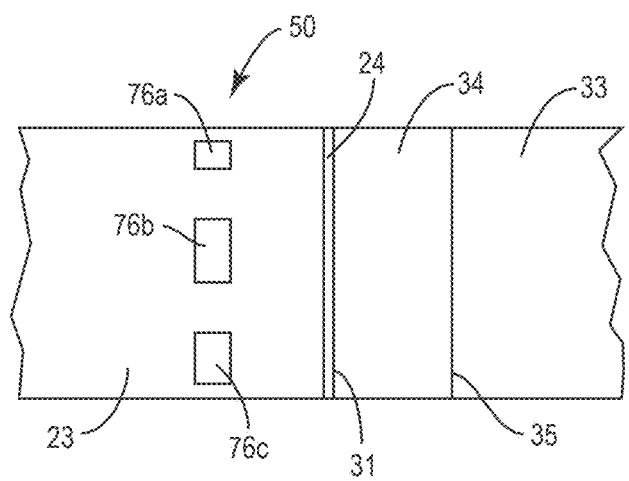
FIG. 7 is a schematic section view of a turbulator segment positioned on an inner flow surface of a nacelle inlet.

In some examples, the strip 70 is a continuous band that extends completely around the nacelle inlet 21. In other examples, the strip 70 is formed by one or more discrete sections 76. FIG. 7 illustrates an example with the strip 70 formed by sections 76a, 76b, 76c. The sections 76 are spaced apart by gaps. In some examples, the sections 76 are positioned completely around the circumference of the nacelle inlet 21. In other examples, the sections 76 are positioned along one or more discrete sections of the nacelle inlet 21. The sections 76 can have the same or different shapes, sizes, and constructions.

Figure 8:
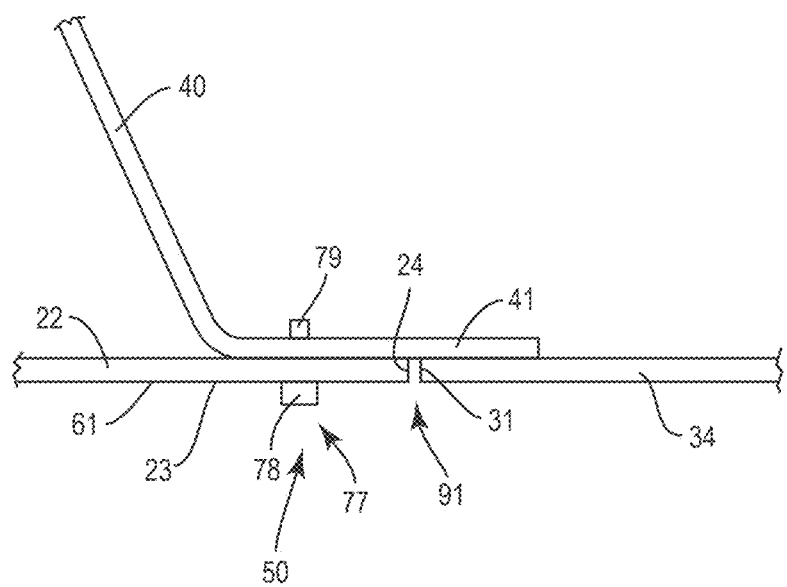
FIG. 8 is a schematic section view of a fastener attached to a lipskin and forming a turbulator segment upstream from an inner barrel edge band.

In some examples, the one or more sections 76 are formed by fasteners 77 that extend outward beyond the lipskin inner flow surface 23. FIG. 8 illustrates an example with a fastener 77 connected to the lipskin 22. The fastener 77 includes a head 78 that is positioned outward beyond the lipskin inner flow surface 23. The fastener 77 also includes a body 79 that extends into and/or through one or more of the lipskin 22 and flange 41. In some examples, a number of fasteners 77 are aligned in a row that extends around a portion or entirety of the circumference of the nacelle inlet 21.

Figure 9:
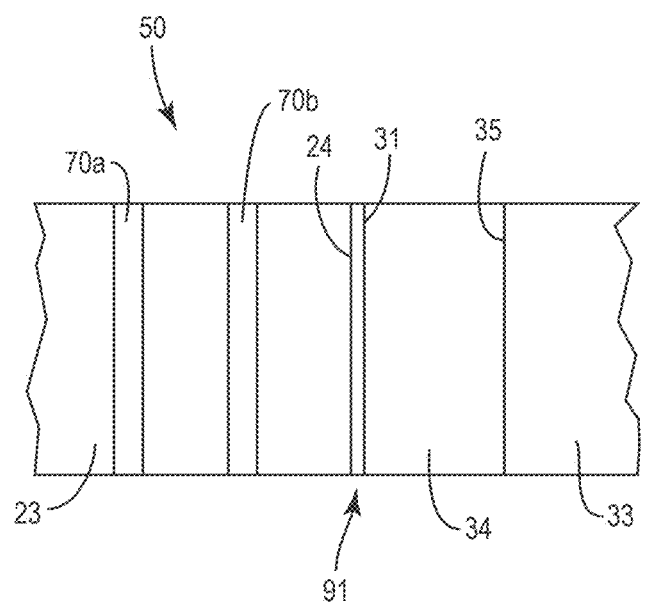
FIG. 9 is a schematic section view of a turbulator segment positioned on an inner flow surface of a nacelle inlet.

In some examples, the turbulator segment 50 includes a single strip 70. In other examples, the turbulator segment 50 includes two or more strips 70. FIG. 9 illustrates an example with a pair of strips 70a, 70b that are each connected to the lipskin 22. In one example as shown in FIG. 9, each of the strips 70a, 70b is continuous around the circumference of the nacelle inlet 21. In other examples, the strips 70a, 70b include different shapes, sizes, and/or constructions. FIG. 9 is an example of a turbulator segment 50 with a pair of strips 70a, 70b. Other examples include more than three separate strips 70.

The one or more strips 70 and sections 76 can be constructed from a variety of different materials, including but not limited to aluminum, composite materials, and plastics. The strips 70 are connected to the nacelle inlet 21 in various manners such as but not limited to one or more of mechanical fasteners and adhesives.

Figure 10:
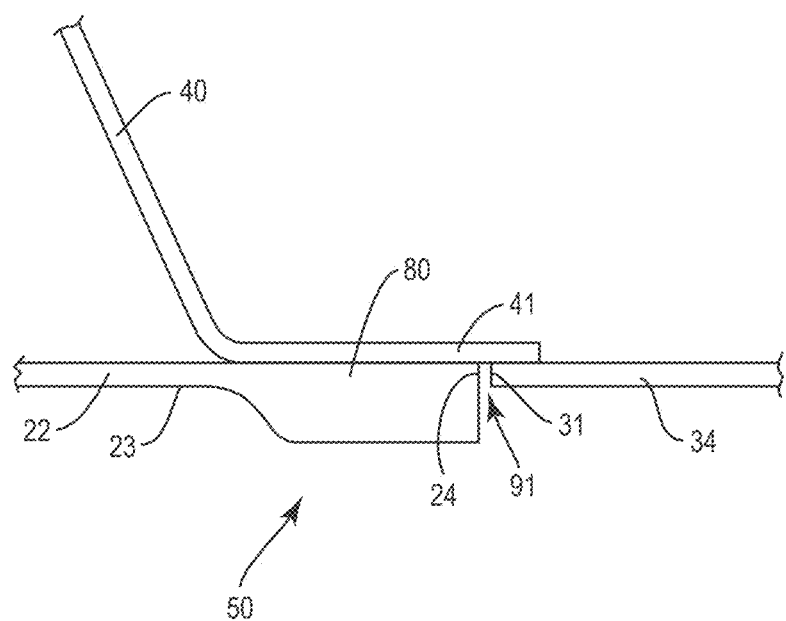
FIG. 10 is a schematic section view of an enlarged section of a lipskin forming a turbulator segment upstream from an inner barrel edge band.

FIG. 10 illustrates an example in which the turbulator segment 50 is formed by an enlarged section 80 of the lipskin 22. In some examples, the enlarged section 80 has a greater thickness than a remainder of the lipskin 22. This thickness results in the enlarged section 80 extending outward a greater distance than the remainder of the lipskin inner flow surface 23 and the edge band 34. The enlarged section 80 can extend around a limited section or entirety of the circumference of the nacelle inlet 21. In some examples as illustrated in FIG. 10, the enlarged section 80 is positioned at the inner lipskin edge 24. In other examples, the enlarged section 80 is spaced forward from the inner lipskin edge 24.

Figure 11:
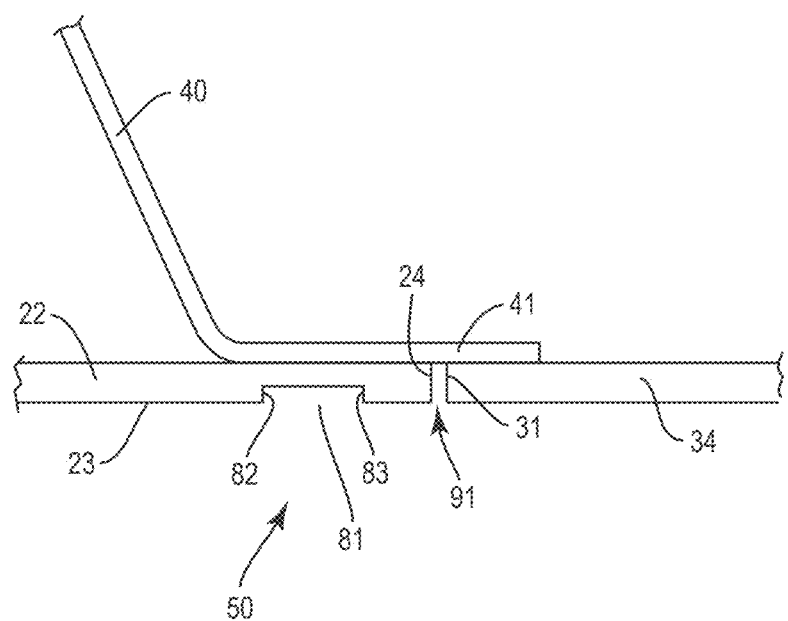
FIG. 11 is a schematic section view of a trough in a lipskin and forming a turbulator segment upstream from an inner barrel edge band.

In some examples disclosed above, the turbulator segment 50 includes one or more members that extend outward from the lipskin inner flow surface 23 to cause turbulent airflow. In other examples, the turbulator segment 50 includes one or more troughs 81 in the lipskin 22. FIG. 11 illustrates an example with a trough 81 formed in the lipskin 22. The trough 81 has a width measured between the leading edge 82 and the trailing edge 83. The depth of the trough 81 below the lipskin inner flow surface 23 can vary. In one example, each of the leading edge 82 and the trailing edge 83 are flat. In other examples, one or both of the leading edge 82 and trailing edge 83 include curved, angular, or other non-flat shapes.

In some examples, the turbulator segment 50 includes a single design feature (e.g., just one or more strips 70, just one or more sections 76, just one or more troughs 81). In other examples, the turbulator segment 50 includes two or more different design features. For example, the turbulator segment 50 includes a combination of strips 70, and/or sections 76, and/or troughs 81. In one example, the turbulator segment 50 includes a first design feature (e.g., strip 70) along a first section of the nacelle inlet 21 and a second design feature (e.g., sections 76) along a second section of the nacelle inlet 21.

The turbulator segment 50 creates a surface discontinuity along the lipskin inner flow surface 23. The turbulator segment 50 is positioned along the lipskin inner flow surface 23 to induce turbulent airflow to one or more downstream sections of the inner flow surface 61. Turbulent airflow promotes cooling of one or more downstream sections of the nacelle inlet 21, including the lipskin 22, inner barrel edge band 34, inner barrel perforated skin 36, inner barrel structural plies 32, and composite core 33. This cooling occurs due to mixing the boundary layer with the cooler adjacent airflow as a result of the transition from laminar to turbulent. Cooling can also occur to one or more of the components through conduction. In one example, cooling of one or both of the lipskin inner flow surface 23 and the inner barrel edge band 34 results in cooling of the bulkhead flange 41. In some examples, the lipskin inner flow surface 23 upstream and downstream from the turbulator segment 50 is substantially smooth.

In one example, one or more of the components of the inner flow surface 61 are constructed from a composite ply material. In one specific example, the structural plies 32 including the inner barrel edge band 34 is constructed from a composite ply material. The composite ply material includes one or more layers of fibers that are impregnated with one or more of a thermoset and thermoplastic matrix resin. The fibers can consist of a variety of materials, including but not limited to aramids, polyolefins, metal, glass, carbon, boron, ceramic, mineral, and combinations.

The fibers are impregnated with a thermoset or thermoplastic matrix resin. In another example, the matrix resin includes a hybrid system of both thermoset and thermoplastic resin. The matrix resin can consist of a variety of substances, including but not limited to acrylics, fluorocarbons, polyamides (PA), polyethylenes (PE) such as polyethylene terephthalate (PET), polyesters, polypropylenes (PP), polycarbonates (PC), polyurethanes (PU), polyetheretherketones (PEEK), polyetherketoneketones (PEKK), polyetherimides (PEI), and other material compositions. This construction from a composite material prescribes a maximum operating limit (MOL) temperature and a maximum short duration limit temperature. Turbulent airflow induced by the turbulator segment 50 promotes the airflow to cool the inner barrel edge band 34 to remain below these limits.

Figure 12:
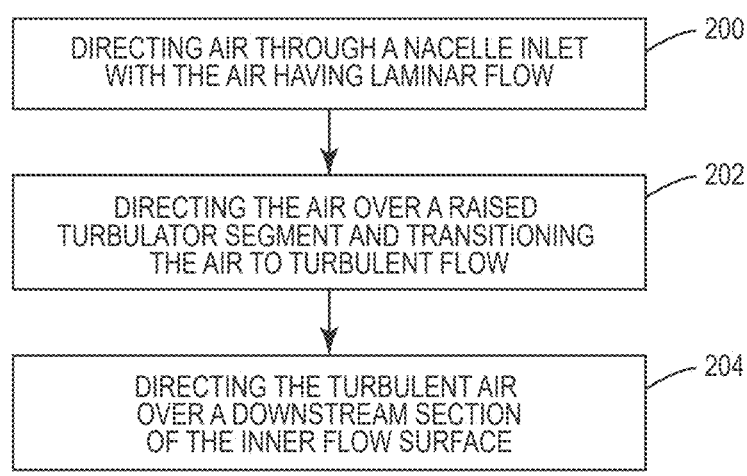
FIG. 12 is a flowchart diagram of a method of cooling a section of an inner flow surface of a nacelle inlet.

FIG. 12 illustrates a method of cooling a section of an inner flow surface 61 of a nacelle inlet 21. The method includes directing air through the nacelle inlet 21 with the air initially having laminar flow along an upstream section of the inner flow surface 61 (block 200). The air is directed over a raised turbulator segment 50 on the inner flow surface 61 after the air has passed over the upstream section and transitioning the air to turbulent flow (block 202). The air with turbulent flow is directed over a downstream section of the inner flow surface 61 of the nacelle inlet 21 (block 204).

In the examples disclosed above, the nacelles 20 house engines 103 and are used on aircraft. It should be understood, however, that the disclosure applies equally to nacelles 20 for other types of engines in other applications, such as but not limited to other vehicles such as but not limited to landcraft, watercraft, and spacecraft, and powerplant applications.

By the term "substantially" with reference to amounts or measurement values, it is meant that the recited characteristic, parameter, or value need not be achieved exactly. Rather, deviations or variations, including, for example, tolerances, measurement error, measurement accuracy limitations, and other factors known to those skilled in the art, may occur in amounts that do not preclude the effect that the characteristic was intended to provide.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A nacelle inlet for an engine, the nacelle inlet comprising:
an inner flow surface;
an outer flow surface;
a turbulator segment positioned along the inner flow surface, wherein the turbulator segment comprises a plurality of fasteners, the plurality of fasteners comprising heads that extend outward beyond the inner flow surface; and
wherein the turbulator segment extends outward beyond the inner flow surface and is configured to transition laminar airflow along the inner flow surface upstream from the turbulator segment to turbulent airflow downstream from the turbulator segment.

2. The nacelle inlet of claim 1, wherein the turbulator segment is a strip that is connected to the inner flow surface, the strip comprising an inner face positioned towards the inner flow surface, an opposing outer face, a leading edge, and a trailing edge.

3. The nacelle inlet of claim 2, wherein the strip extends completely around a circumference of the nacelle inlet.

4. The nacelle inlet of claim 2, wherein the strip comprises a plurality of discrete sections that are spaced apart by gaps.

5. The nacelle inlet of claim 1, wherein the heads are aligned in a row around a circumference of the nacelle inlet.

6. The nacelle inlet of claim 1, wherein the turbulator segment is formed on one or more members that are constructed from materials that are different from the inner flow surface.

7. The nacelle inlet of claim 1, wherein the turbulator segment comprises:
one or more strips; and
fasteners that extend through the one or more strips and into the inner flow surface.

8. A nacelle inlet for an engine, the nacelle inlet comprising:
a lipskin positioned at a forward end of the nacelle inlet, the lipskin comprising a lipskin inner flow surface that extends to an inner lipskin edge;
an inner barrel positioned downstream from the lipskin inner flow surface;
a joint formed between the inner lipskin edge and a leading edge of the inner barrel; and
a turbulator segment positioned at the lipskin inner flow surface upstream from the joint, the turbulator segment configured to transition laminar airflow to turbulent airflow downstream from the joint to draw heat from the inner barrel.

9. The nacelle inlet of claim 8, wherein the inner barrel comprises inner barrel structural plies that are constructed from composite material.

10. The nacelle inlet of claim 8, wherein the turbulator segment is a strip that is connected to the nacelle inlet and that extends outward beyond the lipskin inner flow surface.

11. The nacelle inlet of claim 10, wherein the strip is a continuous band that extends completely around a circumference of the nacelle inlet.

12. The nacelle inlet of claim 8, wherein the turbulator segment comprises a leading edge and a trailing edge and with the trailing edge aligned with the joint.

13. The nacelle inlet of claim 8, wherein the turbulator segment comprises a leading edge and a trailing edge with the turbulator segment positioned forward of the joint with the trailing edge spaced away by a distance from the inner lipskin edge.

14. The nacelle inlet of claim 8, further comprising a bulkhead that spans a lipskin annulus, the bulkhead comprising a flange that extends across an inner side of the joint.

15. The nacelle inlet of claim 8, wherein the turbulator segment comprises a plurality of fastener heads that extend outward beyond the lipskin inner flow surface.

16. The nacelle inlet of claim 8, wherein the lipskin inner flow surface is substantially smooth.

17. The nacelle inlet of claim 8, wherein the turbulator segment is a trough in the lipskin inner flow surface.

18. A method of cooling a section of an inner flow surface of a nacelle inlet, the method comprising:
directing air through the nacelle inlet with laminar flow along an upstream section of the inner flow surface;
directing the air over a raised turbulator segment on the inner flow surface after the air has passed over the upstream section and transitioning the air to turbulent flow, the turbulator surface comprising one or more strips and fasteners that extend through the one or more strips; and directing the air with turbulent flow over a downstream section of the inner flow surface of the nacelle inlet.

19. The method of claim 18, further comprising directing the air over the strip that is attached to the inner flow surface and causing the laminar flow to transition to turbulent flow.

20. The nacelle inlet of claim 8, further comprising a flange that extends across an inner side of the joint.

\* \* \* \* \*